Patented Jan. 22, 1935

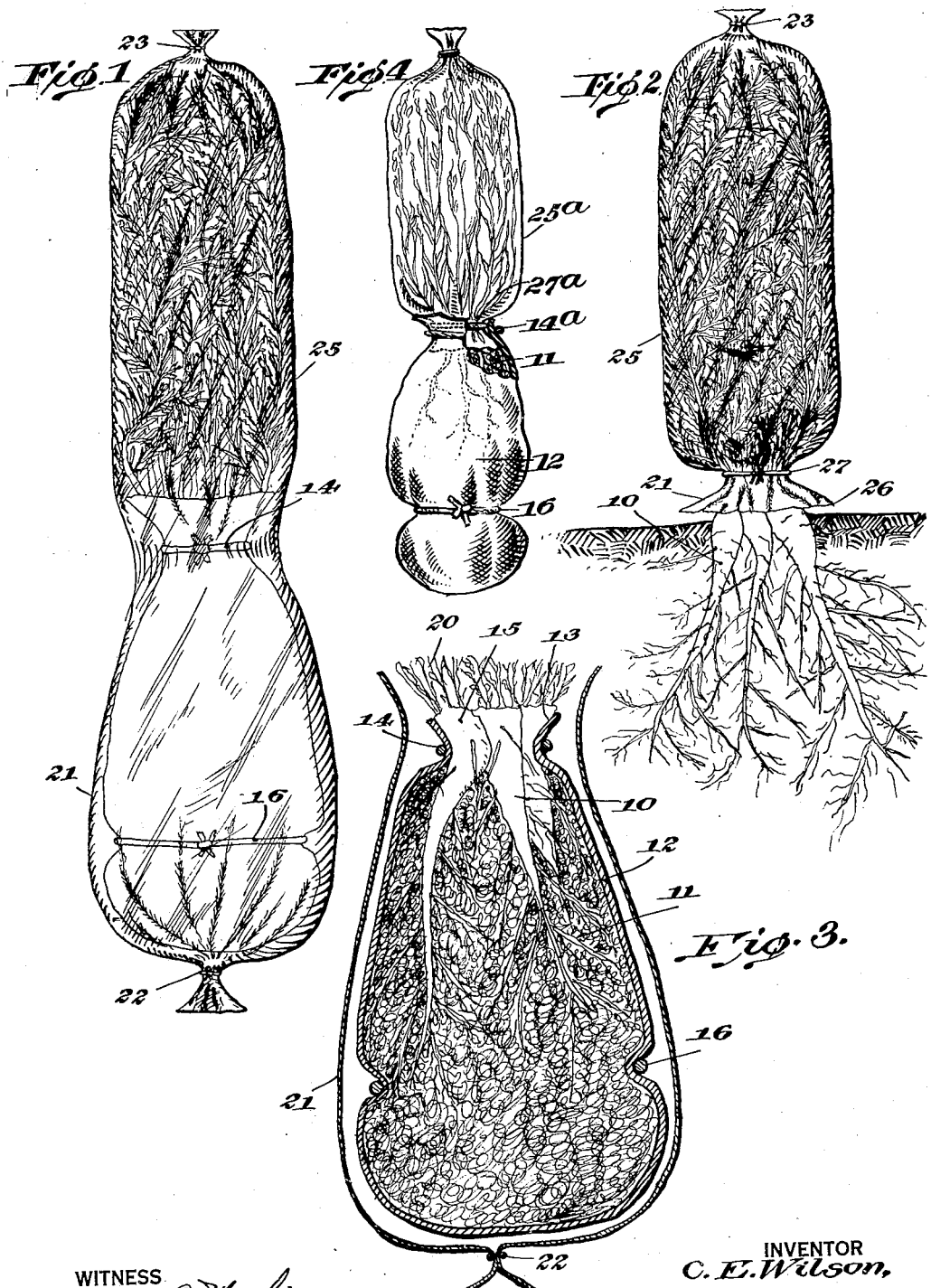

1,988,886

UNITED STATES PATENT OFFICE 1,988,886

PROTECTIVE COVERING FOR PLANTS

Clarence E. Wilson, Manchester, Conn.

Application March 20, 1933, Serial No. 661,814

2 Claims. (Cl. 47—37)

This invention relates to a protective covering for plants.

An object of the invention is the provision of a covering or jacket for plants when being shipped or retained in storage to retain the moisture in the plants with a portion of the covering being held intact about the foliage or branches after the plant has been placed in the ground to protect the branches or foliage against loss of moisture for a definite period or until the roots have been sufficiently resuscitated and are able to supply the plant proper with nourishment and moisture.

A further object of the invention is the provision of a casing for substantially sealing the plant against loss of moisture during shipment and storage which may be partially removed when the plant is placed in the ground so that it is unnecessary to ship the shrubbery encased in a weighty mass of earth, a light packing acting in the capacity of the usual mass of earth for maintaining the moisture in the plant, a portion of the casing embracing the foliage being retained in sealed relation with the foliage to protect said foliage against the loss of moisture for a predetermined time after the plant has been placed in the ground.

A still further object of the invention is the provision of a substantially air-tight and thus substantially moisture-proof envelope for growing plants which are being shipped or retained in storage in which a portion of the envelope is retained about the foliage after the plant has been placed in the ground to sustain the life of the plant with the proper moisture during that period when the roots are readjusting themselves to the new environment preparatory to maintaining the proper circulation of fluids and food.

This invention will be best understood from a consideration of the following detailed description, in view of the accompanying drawing forming a part of the specification; nevertheless, it is to be understood that the invention is not confined to the disclosure, being susceptible of such changes and modifications which shall define no material departure from the salient features of the invention as expressed in the appended claims.

In the drawing:

Figure 1 is a view in elevation of a plant shown enclosed in my protective casing, Figure 2 is a view in elevation showing the plant in the ground with a portion of the casing retained in sealing relation with the branches or foliage, and Figure 3 is an enlarged vertical section showing the wrappings for the roots and an auxiliary casing and packing to maintain moisture in the neighborhood of the roots.

Figure 4 is a view in elevation partly in section of a modified form of the wrapping.

Referring more particularly to the drawing, 10 designates the roots of a plant, and in this case an evergreen is shown, the roots being packed in the usual form of moss 11 or other suitable material, and the whole is enclosed within a substantially moisture-proof wrapping 12.

As shown more particularly in Figure 3, the upper end 13 of the wrapping is securely tied at 14 about the crown 15 of the plant so that when the packing 11 has been properly saturated with water and the wrapping 12 is tied at 14, the moisture will be retained about the roots a sufficient length of time for the usual shipment and storage of the plants so that the roots will be in proper condition when inserted in the ground to function in a normal manner. A cord or wire 16 is securely bound around the lower portion of the wrapping for the roots for maintaining the lower portion of the wrapping in proper position.

It is well known in the art that the roots of plants are lifted from the ground with a ball of earth with the roots undisturbed. The theory is that if the roots are not disconnected from the soil, the natural flow of the sap through the plant will not be cut off, except by exhaustion of the moisture in the ball of earth. In the present instance, however, this ball of earth may be eliminated and a moss or other light packing may be employed in connection with a casing housing the foliage so that evaporation through the top of the plant would be brought to a practical standstill and thus greatly retard the exhaustion of moisture from the light packing or ball of earth when employed. The casing housing the foliage therefore makes the ball of earth unnecessary and thus saves a great deal in handling, freight, and crating expense.

In order to seal the entire plant against the loss of moisture a casing of some suitable material, as shown at 21, houses not only the roots and packing embracing the roots, but the entire foliage may be moistened before the casing 21 is applied as an additional precaution to maintain the proper quantity of moisture about the plant. The casing 21 may be formed of regenerated cellulose which is sufficiently transparent to permit the light rays to pass to the foliage or the casing may be formed of any other suitable material which may be opaque if desired.

An important feature, however, is the casing which is sufficiently air-tight and moisture-proof to protect the entire plant against undue loss of moisture so that the plant when placed in the ground will be ready to function in the usual manner within a reasonable time.

The casing 21 may be in the form of a cylinder so that the lower end may be tied, as shown at 22, to provide a seal while the upper end is tied, as shown at 23, to provide a sack, casing, or container for the entire plant.

While I have shown one means of securing the ends together, that is, by tying, it will be appreciated that one end may be formed as an integral enclosure and any other suitable means may be employed for sealing the opposite end.

The upper portion of the casing, as shown at 25, may be retained over the foliage to prevent the loss of moisture with the lower portion being cut away, as indicated at 26. Any form of means, as shown at 27, may be employed for securing the upper portion of the container about the crown of the plant after the packing 11 and 12 has been removed and the roots 10 placed in the ground. By retaining the upper portion 25 for a short period during the spring planting season or for the entire winter season moisture will be retained about the foliage during that time that the roits are naturally assuming their proper functions in the ground. It will be seen that no unnecessary burden is placed upon any portion of the plant after the same has been transplanted. While it is true that an evergreen or shrubbery is disclosed in the drawing, it will be appreciated that the casing 21 and the wrappings 11 and 12 may be applied to any type of plant which is sold on the market. Plants thus actually treated show a tendency to retain a live and normal color even after the plants have been removed from the ground during the fall and winter seasons and while the plants are in a passive state.

In other words, a protective device for plants is provided and includes the packing 11 and the substantially waterproof wrapping 12 for the roots of the plant. The casing 21 houses the entire plant including the foilage and the wrapped roots and thus forms a substantially air-tight container for the plant during transportation and storage. Before the plant is placed in the ground the lower portion of the casing 21 is cut away below the crown of the plant or below the fastening means 14 for the waterproof wrapping 12. The waterproof wrapping 12 and the packing 11 are then removed by a release of the cords 14 and 16 and the roots are then placed in the ground. The upper portion of the transparent casing 21 which has been retained is then securely sealed to the crown of the plant in any approved manner so that a substantially air-tight housing is provided for the foliage for a predetermined period after the roots of the plants have been placed in the ground and until such time as the roots have re-established themselves in the soil.

As shown in Figure 2 the container 21 has been cut off but the plant may be originally packed with this portion of the container applied, as shown in Fig. 4, only to the upper portion with the lower end of the container secured around the crown. The roots may then be encased within the wrapping as shown so that when the plant is received by the purchaser he may only remove the wrappings from the roots with the casing applied to the foilage, thereby eliminating the necessity of cutting off a portion of the container so that substantially the same results will be obtained.

Referring more particularly to Figure 4 it will be seen that a modified form of protective casing 25ª is secured at 27ª in any approved manner to the crown of the plant while the wrapping 12 is secured at 14ª at its upper end in embracing relation with the secured portion of the casing 25ª. If desired, a ring of wax or other suitable material may be applied to the crown where the lower end of the casing 25ª is secured to the crown in order to aid in preventing the loss of moisture at this point.

When the plant so packed, as shown in Figure 4, is prepared for planting the wrapping 12 is removed together with the light weight packing 11 and the roots are then placed in the ground while the casing 25ª is retained in position on the foliage to protect the plant and foliage against the loss of moisture by evaporation during the time that the roots are re-establishing themselves in the soil in order to carry on their normal functions.

It will be appreciated that the packing 11 is sufficiently moistened to maintain the roots in proper condition during transportation and storage.

When the casing is employed in connection with coniferous plants the top portion of the envelope or casing is retained on the plant throughout the winter if the planting is done in the fall and until the growth starts in the spring. When the planting is done in spring on coniferous plants the top envelope or casing 25 or 25ª is retained on the foliage for two or three weeks, depending upon the type of climate, and progress of plant as evidenced by its activity in starting growth. When the casing 21 is employed in connection with perennial plants the casing embraces the entire plant including the roots and after the wrappings have been removed from the roots, the casing is retained over the foliage and may be either lightly tied to the crown of the plant or soil may be packed around the lower edge of the casing.

While I have shown the use of moss or some light packing material which is saturated with moisture for application to the roots, it will be appreciated that in the smaller plants the usual soil may be employed. However, since the substantially air-tight casing will maintain a humid condition about any kind of plant, large or small, until the natural functions have been resumed after transplanting, a great economy will be had when the usual ball of earth may be dispensed with.

The form of the casing 21 is immaterial so long as it is substantially air-tight and will control moisture evaporation and consequent loss of vitality of the plant and protect the plant after transplanting until the natural functions have been resumed.

I claim:

1. A protective device for plants comprising a packing and substantially water-proof wrapping for the roots of a plant, a casing housing the foliage and wrapping for the roots and forming a substantially airtight container for the plant during transportation and storage, the lower portion of the casing and wrapping being removable so that the roots may be placed in the ground, the remaining portion of the casing being retained in housing relation with the foliage, and means for sealing to the crown of the plant that portion of the casing which is adjacent the crown, thereby forming a substantially airtight housing for the foliage for a predetermined period until the roots of the plant have reestablished themselves in the soil.

2. A protective device for plants comprising a packing and substantially waterproof wrapping for the roots of a plant, a substantially translucent casing co-operating with the packing and wrapping to completely house the plant against the loss of moisture through the foliage, means for securing the wrapping and casing to the crown of the plant, said packing and wrapping adapted to be removed when the roots are established in the soil.

CLARENCE E. WILSON.